March 16, 1943.    V. HAIGH    2,314,042
TRANSMISSION CONTROL
Filed July 24, 1941    2 Sheets-Sheet 1
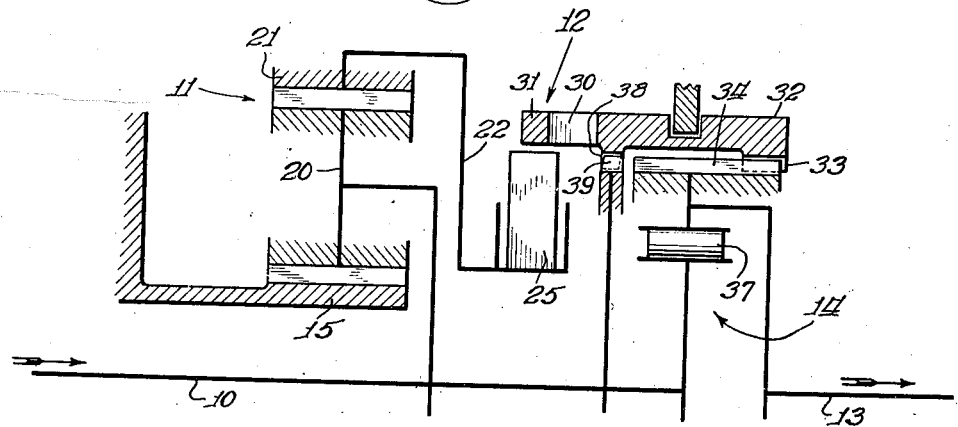
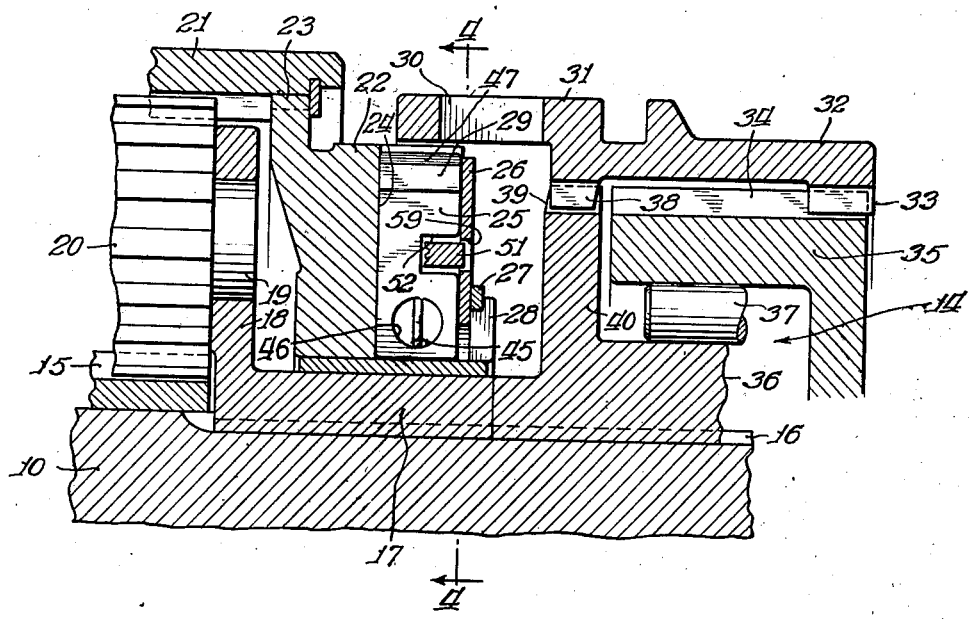
Inventor:
Vaughn Haigh
By Edward C. Gritzbaugh
Atty.

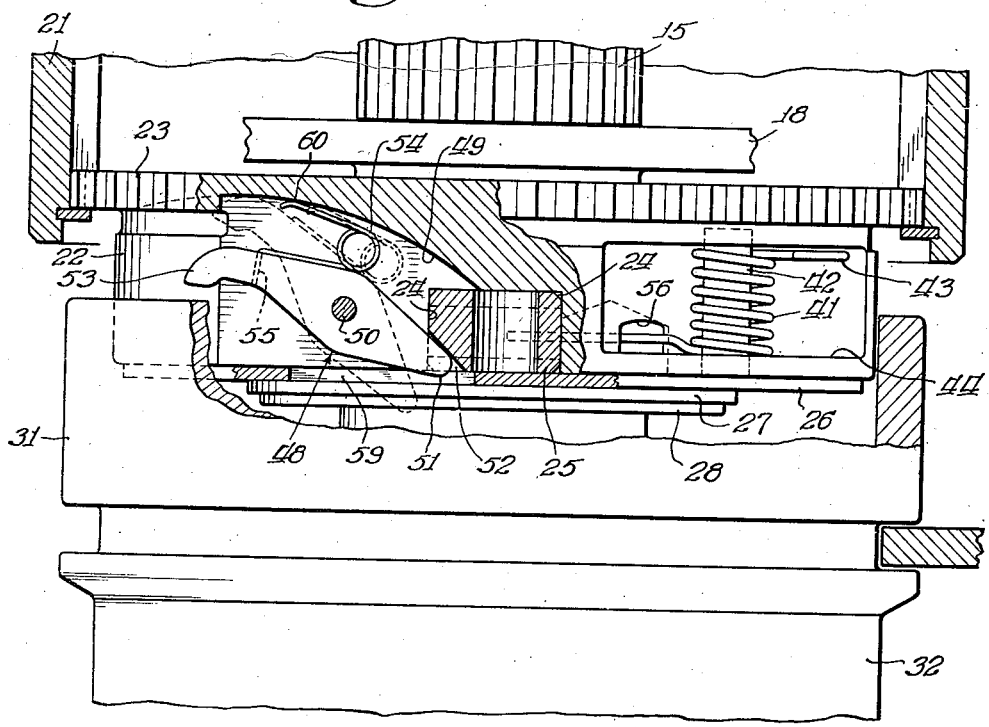

Patented Mar. 16, 1943

2,314,042

UNITED STATES PATENT OFFICE 2,314,042

TRANSMISSION CONTROL

Vaughn Haigh, Muncie, Ind., assignor to Borg-Warner Corporation, Chicago, Ill., a corporation of Illinois Application July 24, 1941, Serial No. 403,813

16 Claims. (Cl. 192—105)

This invention relates to power transmitting mechanism of the type wherein a change in the torque conditions in the mechanism is effected by shifting movement of a positive coupling element under the control of centrifugal force and wherein supplementary control is provided by a device shiftable to a position in which it is adapted to establish conditions different from those established by the centrifugal mechanism. The object of the invention is, in general, to provide means actuated in timed relation to the movement of such shiftable device for rendering the coupling element inoperative.

In its more specific aspects, the invention deals with speed responsive clutch mechanism of a type wherein a windowed sleeve is shiftable from a position in which it is adapted to receive a centrifugally controlled coupling element for establishing a drive, to a position in which the coupling element cannot couple therewith, and it is an object of the invention to provide means, rendered effective by movement of the sleeve to the last mentioned position, for restraining the coupling element from contact with the sleeve.

Another object of the invention is to provide, in a transmission of a type embodying a centrifugal force responsive clutch having radially movable pawls and a windowed sleeve member shiftable from a position wherein the clutch is operative to a position wherein it establishes a drive of a ratio different from that established by the clutch, means rendered effective by movement of said member to the last mentioned position, for restraining the radially movable pawls from contact with the windowed sleeve of the clutch.

The primary purpose of the invention is to eliminate all contact between a centrifugally controlled clutch element and its coacting clutch member except when the mechanism is conditioned for the establishment of clutch engagement between said element and member, so as to avoid "scrubbing" of the centrifugal element against the coacting clutch member, and the wear and destruction attendant thereon.

Attempts have been made in the past to solve this problem by employing a balk ring controlled by differential rotation of the respective driving and driven members of a "Keller" clutch. Such a balk ring depends upon frictional engagement with one of the members. The present invention eliminates the dependence upon such frictional engagement and provides a positive actuation of the pawl restraining means in accordance with the position of a shiftable drive establishing device such as the combined direct drive lock-up sleeve and window member of an overdrive transmission. Thus the device is positive in operation. In addition, the invention provides a pawl restraining mechanism which is of exceedingly simple construction and does not greatly increase the cost of production of a transmission in which it is incorporated.

The present invention deals particularly with the problem of providing a restraining device which is simple and inexpensive in construction and yet positive and certain in operation, and which will not yield to any appreciable extent under the pull of the centrifugal element.

Other objects, the advantages and uses of the invention will become more apparent after reading the following specification and claims, and after consideration of the drawings forming a part of the specification, wherein:

Fig. 1 is a schematic layout of a transmission embodying the invention;

Fig. 2 is an axial sectional view of the same;

Fig. 3 is a plan view, partially in section, of the mechanism; and

Fig. 4 is a transverse sectional view of the mechanism taken as indicated by the line 4—4 of Fig. 2.

As an example of one form of mechanism in which the invention may be embodied, I have shown in the drawings an overdrive transmission comprising a drive shaft 10, planetary gearing indicated generally at 11, a positive clutch, indicated generally at 12, adapted to connect the drive shaft 10 to the driven shaft 13 through the medium of the planetary gearing 11, and an overrunning clutch, indicated generally at 14, adapted to establish a direct one-way drive between the drive shaft 10 and the driven shaft 13 when the clutch 12 is disengaged. The planetary gearing 11, when the clutch 12 is engaged, is adapted to overdrive the driven shaft 13.

The planetary gearing 11 includes a sun gear 15 through which the drive shaft 10 extends and with reference to which the drive shaft 10 is freely rotatable. The sun gear 15 is secured, either permanently or by releasable means, to a non-rotating member such as a portion of the housing of the transmission. Splined at 16 on the drive shaft 10 is a hub portion 17 of a planet carrier 18. Mounted in the carrier 18 are pinion shafts 19 on which are journalled the planet pinions 20 meshing with the sun gear 15. With the sun gear 15 stationary, the planet pinions 20 will track thereon so as to transmit rotation at a faster rate of speed than that of the drive shaft 10, to the ring gear 21 encircling the planet pinions 20 and meshing therewith.

The overdrive thus received by the ring gear 21 is transmitted through the clutch 12 which comprises an annular pawl carrier 22 having a toothed periphery 23 splined to the teeth of the ring gear 21. The carrier 22 is provided with a radial slot 24, in which is mounted a centrifugal force responsive pawl 25. The pawl 25 is confined axially by a retainer washer 26 held in place against the rear face of the carrier 22 by a snap ring 27 recessed into the hub region 28 of the carrier.

The outer end of the pawl 25 is reduced in circumferential width to form the coupling element 29 adapted to be received in a window 30 in the clutch shell 31, thus to establish a drive through the clutch 12. The inner region of the pawl 25 constitutes centrifugal weight mechanism for urging the coupling element 29 toward engaged position when the pawl carrier is rotated.

The shell 31 is formed integrally with a clutch sleeve 32 which has internal teeth 33 slidingly meshing with external teeth 34 on the periphery of the overrunning clutch drum 35 formed integrally with the driven shaft 13. Thus the sleeve 32 is drivingly connected at all times with the driven shaft, while being capable of axial shifting movement.

With the shell 31 in its left hand position (opposite to the position shown in Fig. 2), and with the pawl 25 retracted, direct drive will be transmitted from the drive shaft 10 to the driven shaft 13 through the medium of the overrunning clutch 14 which comprises the drum member 35, a core member 36 splined to the planet pinion carrier hub 17, and a series of clutch rollers 37. When the sleeve 32 is in the position shown in full lines in Fig. 2, it is adapted to establish a two-way drive bridging the overrunning clutch 14. To this end, the sleeve 32 is provided with internal teeth 38 adapted to mesh with external teeth 39 on the periphery of a flange 40 formed integrally with the pinion carrier hub 17.

The pawl 25 is urged inwardly toward its disengaged position by a spring (Fig. 4) having a central loop 41 encircling a pin 42 mounted in the carrier 22, an end portion 43 engaged against the bottom of a recess 44 in the carrier 22, and an end 45 engaged in an opening 46 in the pawl. The recess 44 is milled into the periphery of the pawl carrier. The end portion 45 extends from the recess 44 into the pawl slot 24 through a passage 56 drilled axially into the side of the carrier 22.

Assuming now that the shell 31 is in position to receive the coupling element 29, and that the torque is being transmitted from the drive shaft 10 to the driven shaft 13 through the overrunning clutch 14, an increase in the speed of rotation to a predetermined point will develop sufficient centrifugal force in the pawl 25 to overcome the restraining force of the spring member 45, whereupon the pawl will move outwardly into engagement with the shell 31. The pawl carrier will however, be rotating at a faster rate of speed than the shell 31, owing to the overdrive through the planetary gearing 11, and the coupling element 29 will ratchet against the interior of the shell. In order that ratcheting may occur, the end of the coupling element 29 is beveled as at 47. With the pawl ratcheting, engagement of the clutch may be effected by decelerating the drive shaft 10 until the speed of rotation of the carrier has decreased to that of the shell 31, permitting the coupling element 29 to enter the window 30.

The mechanism described above is that of a conventional overdrive transmission. When the shell 31 of such a transmission is in the position shown in full lines in Fig. 2, the window 30 is out of register with the clutch element 29 and the end region of the shell blocks radially outward movement of the pawl 25. With the parts in this position, the pawl will move outwardly to bring the coupling element 29 into engagement with the end region of the shell 31 at all times when the speed of the rotation of the carrier is in the overdrive range. This will cause a constant scrubbing of the coupling element against the interior surface of the shell, since the pawl carrier will be constantly overdriven with reference to the shell as long as a 1:1 ratio exists between the driving and driven shafts.

The invention provides means for restraining the pawl out of engagement with the shell 31 so as to completely eliminate such scrubbing action when the shell 31 is in the two-way direct drive position. Such restraining means comprises an element which is adapted to assume a restraining position when the sleeve is in direct two-way drive position and to be engaged by the sleeve as the latter moves toward coupling position, and thereby moved away from the restraining position.

The restraining mechanism comprises a latch element 48 of plate metal, positioned in a plane perpendicular to the longitudinal axis of the pawl 25, and mounted in a recess 49 in the pawl carrier 22. The latch element 48 is pivoted on a pin 50 pressed into a drilled opening 57 in the carrier 22. It has a latching end 51 which is receivable in a notch 52 in the pawl 25, and a tail end 53 which projects beyond the periphery of the carrier 22 into the path of shifting movement of the forward end of the clutch sleeve 31.

A spring 54 has an end 55 mounted in the tail portion 53 of the latch element 48 and an opposite end 60 engaged against the bottom of the recess 49. The spring 54 yieldingly urges the latch element 48 in a counterclockwise direction as viewed in Fig. 3 so as to cause the latching end 51 of the latch element to enter the pawl notch 52 when permitted to do so. The sleeve 31, when shifted rearwardly to its direct two-way drive establishing position, permits the latch element to move to this latching position.

With the latch element in the latching position, any tendency of the pawl 25 to move outwardly under the pull of centrifugal force will be restrained by the engagement of the radially inner side of the notch 52 against the latching end 51 of the element 48. The latch element is of fairly heavy construction, is received in the recess 49 with just sufficient play to be capable of free pivotal movement, and is supported therein against radial movement through a major portion of its length. Thus there is no possibility whatever of the latch element yielding sufficiently to permit any contact between the pawl and the sleeve 31.

When the sleeve 31 is shifted forwardly to its position for coupling with the pawl 25, the forward end of the sleeve will engage the tail portion 53 of the latch element 48 and move it forwardly, thereby causing the latch element to pivot in a clockwise direction to the unlatched position shown in dotted lines in Fig. 3. This removes the latching end 51 from the notch 52, thus permitting the pawl to move outwardly under centrifugal force, to establish coupling engagement of the coupling element 29 in the window 30.

When the sleeve 31 is shifted rearwardly to its direct two-way drive position, the latching end 51 will enter the pawl notch 52, which is of ample width to provide plenty of clearance between the sides of the latch element and the sides of the notch, so as to avoid any possibility of the latch element being held away from latched position by contact with the side face of the pawl. Should the pawl happen to be in a projected position at the time the sleeve 31 is shifted rearwardly, the latching element will ride against the smooth face of the pawl until the pawl moves inwardly to its retracted position, whereupon it will drop into the notch 52. Thus the latch element is certain in operation and does not interfere with the operation of sleeve 31.

The invention adds very little to the cost of a conventional pawl type of clutch. The recess 49 is readily formed by a milling operation. The latch element may be die blanked.

I claim:

1. In a mechanism for transmitting torque from a driving to a driven member, means for changing the torque including a positive coupling element, centrifugal force responsive means for moving said element, means in which said coupling element is mounted for sliding movement, a cooperating coupling member shiftable to and from a position wherein said coupling element is adapted to establish positive coupling engagement therewith, and a latch element mounted in said mounting means in a plane transverse to the axis of movement of said coupling element and having a portion adapted to move from a position obstructing to a position permitting movement of said coupling element to its coupling position, said latch element being rendered effective to move to its obstructing position by movement of said coupling member away from its coupling position.

2. In a centrifugal positive clutch, a pawl carrier, a radially movable centrifugal force responsive pawl including a coupling element, mounted in said carrier, a shell having a window adapted to receive said coupling element, said shell being movable from a position wherein said window is adapted to register with said coupling element to a position wherein said window is out of register with the coupling element, and a latch element mounted in said carrier in a plane transverse to the axis of movement of the pawl, said latch element being movable from a position obstructing to a position permitting projection of said pawl to coupling position, and being rendered effective to move to said obstructing position by movement of said shell to its last mentioned position.

3. A centrifugal clutch as defined in claim 2, wherein the carrier is provided with a recess in which a major portion of the latch element is received and supported against radial movement, an end portion of the latch element being adapted to project out of said recess for obstructing pawl movement, said end portion being substantially rigid and unyielding when thus projecting.

4. A centrifugal positive clutch as defined in claim 2, wherein the carrier is provided with a parallel walled recess and the latch is a flat stamping of relatively thick non-yielding material mounted in said recess and having an end portion adapted to project out of the recess for obstructing the pawl.

5. A centrifugal clutch as defined in claim 2, wherein the latch element is pivoted for movement in its own plane and is disposed on one side of the pawl, circumferentially, with its longitudinal axis lying chordally with reference to the periphery of the carrier, its inner end being adapted to project into a notch in the pawl and its outer end projecting beyond the periphery of the carrier into the path of shifting movement of the shell and adapted to be engaged by the shell when the latter is shifted to its first mentioned position and thereby rotated so as to remove said latching end from said notch.

6. A centrifugal clutch as defined in claim 2, wherein said carrier is provided with a milled recess extending chordally therein in a plane perpendicular to the axis of movement of the pawl, wherein the pawl has a notch registering with one end of said recess, and wherein said latch element is pivoted in said recess, with one end adapted to extend into said notch and the other end projecting beyond the periphery of the carrier into the path of movement of said shell, and a spring interposed between the latch element and the bottom of said recess and applying yielding pressure to the latch element at a point intermediate the pivot and said other end so as to urge said one end toward its position received within said notch.

7. In a mechanism for transmitting torque from a driving to a driven member, means including a centrifugal positive clutch for establishing a drive between said members, a device shiftable to establish a drive of a different character between said members, said clutch including a movable coupling element, a carrier in which said element is mounted for sliding movement, and a restraining element, mounted in said carrier for movement in a plane transverse to the axis of movement of said coupling element, from a position obstructing to a position permitting projection of said coupling element to coupling position, the movement of said latch element to obstructing position being controlled by movement of said shiftable device to its position for establishing said drive of a different ratio.

8. A power transmission mechanism as defined in claim 7, wherein said carrier has a recess in which a major portion of said latch element is received and supported against radial movement.

9. A power transmission mechanism as defined in claim 7, wherein said carrier has a recess in which the major portion of said latch element is received and supported against radial movement, said latch element being pivoted in said recess and having one end arranged for obstructing coaction with said coupling element and its opposite end projecting beyond the periphery of the carrier and into the path of movement of said shiftable device.

10. A power transmission device as defined in claim 7, including means for yieldingly urging said latch element toward its obstructing position, said latch element being adapted to be engaged by said shiftable device for movement to its non-obstructing position.

11. A power transmission mechanism comprising driving and driven members, means including a centrifugal positive clutch for establishing a drive between said members, said clutch including a carrier and a coupling element mounted in said carrier for movement under the control of centrifugal force from a retracted to a projected position, and a coacting clutch device shiftable from a position wherein said element is adapted to couple therewith when projected, to a position wherein it establishes a drive of a different character between said members, and a latch element mounted in said carrier for movement in a plane transverse to the axis of movement of said coupling element, from a position obstructing to a position permitting projection of said coupling element, said latch element being rendered effective to move to its obstructing position by movement of said coacting clutch device to the position wherein it establishes said drive of a different character.

12. In a transmission for automotive vehicles, means including a centrifugal positive clutch for establishing a drive of a non-direct ratio, said clutch including a carrier, a coupling element mounted in said carrier for movement under the control of centrifugal force from a retracted to a projected position, and a coacting member with which said element is adapted to couple when projected, an overrunning clutch adapted to automatically establish a one-way direct drive when said positive clutch is released, means to establish a two-way direct drive across said overrunning clutch, and a latch element mounted in carrier for movement in a plane transverse to the axis of movement of said coupling element, from a position obstructing to a position permitting projection of said coupling element, said latch device being rendered effective for movement to obstructing position by movement of said two-way direct drive means to its operative position.

13. In a centrifugal positive clutch including a carrier, a pawl mounted in said carrier for radial movement between projected and retracted positions, an annular coupling shell shiftable axially to and from a position wherein said element may be coupled therewith for establishing a drive, said carrier having a recess extending chordally therein, and a latch element mounted in said recess for movement from a position wherein one end thereof obstructs, to a position wherein said end permits, a projection of said coupling element, the other end of said latch element projecting beyond the periphery of the carrier and into the path of movement of said annular coupling member and being adapted to be engaged by the latter for moving said one end to non-obstructing position.

14. A clutch device as defined in claim 13, including resilient means acting between said latch element and the carrier for yieldingly urging said latch element toward obstructing position.

15. In a centrifugal positive clutch, a carrier having a radial recess therein, a coupling element mounted in said recess for radial movement under the effect of centrifugal force between projected and retracted positions, an annular coupling member shiftable axially to and from a position encircling said carrier and adapted to receive said coupling element to establish a drive, said carrier having a chordally extending recess opening at one end into said carrier recess and at its other end into the periphery of the carrier, and a latch element mounted in said chordal recess for movement from a position wherein one end thereof projects into said recess in obstructing relation to said coupling element to a position wherein it permits the coupling element to be projected, the other end of said latch element projecting beyond the periphery of the carrier and into the path of shifting movement of said annular coupling member and adapted to be engaged by said annular coupling member when the latter is moved to coupling position, and to be thereby moved to non-obstructing position.

16. In a mechanism for transmitting torque from a driving to a driven member, means including a centrifugal positive clutch for establishing a drive between said members, a device shiftable to establish a drive of a different character between said members, said clutch including a movable coupling element, a carrier in which said element is mounted for sliding movement, said carrier having a recess extending chordally therein, and a latch element mounted in said recess for movement from a position wherein one end thereof obstructs, to a position wherein said end permits, projection of said coupling element, the other end of said latch element projecting beyond the periphery of the carrier and into the path of movement of said shiftable device and being adapted to be engaged by the latter for moving said one end to non-obstructing position.

VAUGHN HAIGH.